UNITED STATES PATENT OFFICE.

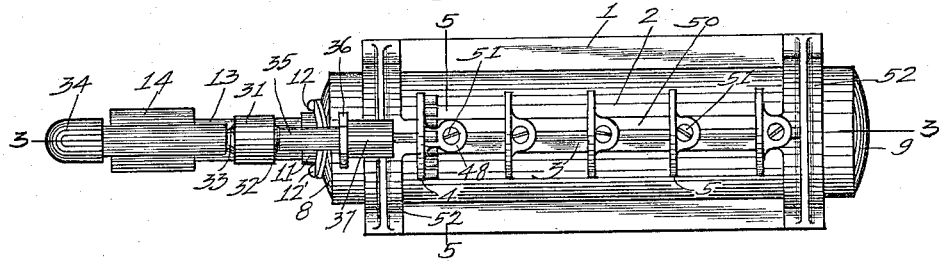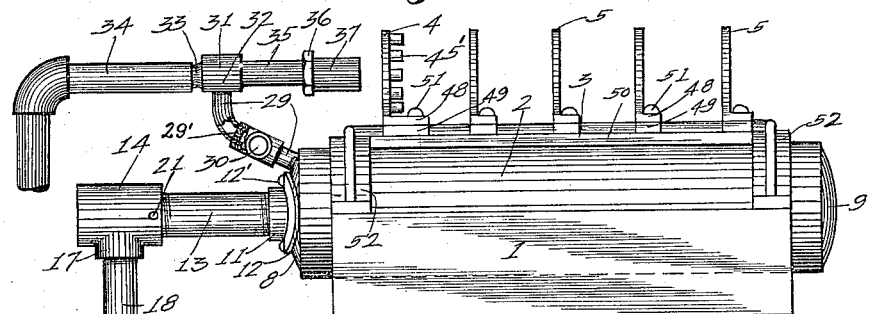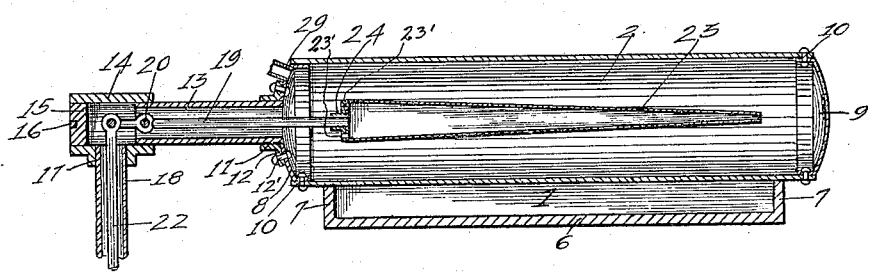

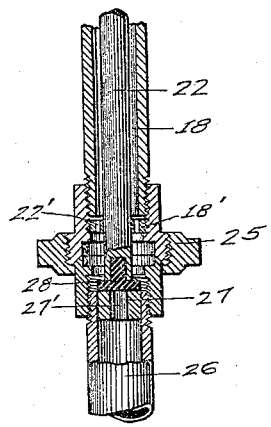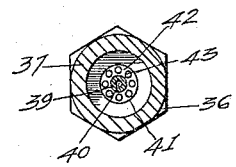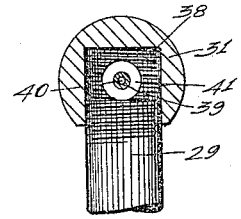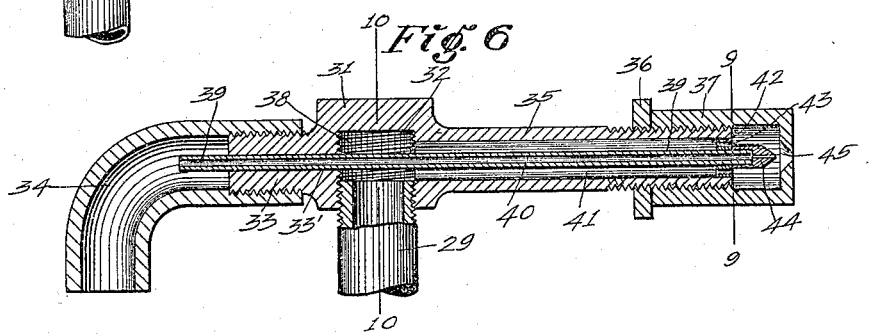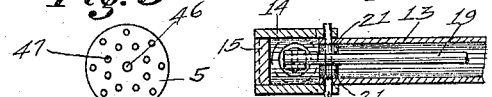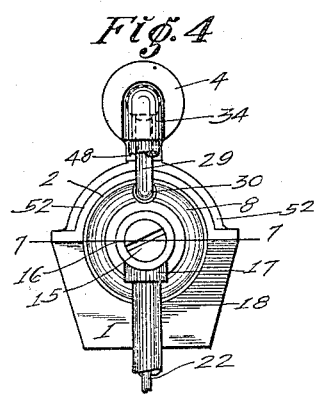

PHINEAS A. VORE AND VERNON W. VORE, OF LONG BEACH, CALIFORNIA.

LIQUID-FUEL BURNER.

1,172,849.  Specification of Letters Patent.  Patented Feb. 22, 1916.

Application filed July 21, 1914. Serial No. 852,310.

*To all whom it may concern:*

Be it known that we, PHINEAS A. VORE and VERNON W. VORE, citizens of the United States, residing at Long Beach, in the county of Los Angeles and State of California, have invented new and useful Improvements in Liquid-Fuel Burners, of which the following is a specification.

Our invention relates to liquid fuel burners as applied to cooking stoves and heaters and has for its object the provision of a simple, economical and practical burner which may be conveniently and easily applied to any ordinary form of stove; which will maintain a uniform spray of fuel from the nozzle and a consequent uniform supply of heat; and which has means for adjusting the angle of deflection of the flame from the burner.

An object is to provide a nozzle to the burner which is capable of adjustment and adapted for use with several kinds of liquid fuel, such as crude oil, distillate, etc.

Our burner involves the use of steam for spraying the fuel from the nozzle, and as in other types of burners, a great deal of trouble is experienced because of the fluctuation in the steam pressure.

An object of our burner is to provide means for automatically controlling the supply of water to the steam boiler or generator so that the steam pressure and the quantity of water in the generator may be uniform.

Other objects may appear in the description of our invention, as illustrated in the accompanying drawings, in which—

Figure 1 is a plan; Fig. 2 is a side elevation; Fig. 3 is a sectional elevation of Fig. 1 on the line 3—3, with the upper frame removed; Fig. 4 is an end elevation; Fig. 5 is a sectional elevation on the line 5—5, Fig. 1; Fig. 6 is a longitudinal section of the nozzle; Fig. 7 is a fragmentary sectional plan of the water supply pipe and float rod on the line 7—7, Fig. 4; Fig. 8 is an enlarged sectional elevation of the float controlled water supply valve and union; Fig. 9 is a section of the nozzle on the line 9—9, Fig. 6; Fig. 10 is a section of the nozzle on the line 10—10, Fig. 6, and Fig. 11 is a section through the center of the steam outlet.

Similar characters of reference indicate the same parts throughout the specification and the several views of the drawings.

Our burner consists of a base 1 having the form of a pan for holding the fuel and upon which we mount the steam generator 2 and the skeleton frame 3 holding the flame deflecting disks 4 and 5, all of which elements as shown assembled in Fig. 2 being adapted to be placed in the fire box of an ordinary stove, from which they may be easily removed for cleaning or other purposes.

The base and fuel pan 1 has a solid bottom 6 and the ends 7 which have semi-circular seats formed therein to receive the generator 2, and the generator is of the form of a cylinder with the heads 8 and 9 secured in position at each end by means of rivets 10, or in any other suitable manner. The forward head 8 has a neck 11 secured to it by means of a flange 12 and rivets or screws 12', the neck being provided with an opening adapted to receive one end of the pipe 13 which registers with a similar opening centrally disposed in the end of the generator. The pipe 13 is screwed into a T fitting 14 at its other end and the opposite end of the T is provided with a plug 15 having a groove 16 so that it may be removed by a screw driver or other implement for the purpose of cleaning or assembling the mechanism in the pipe 13, as hereinafter described. The T 14 has an extension 17 on the bottom into which is screwed the pipe 18 of substantially smaller diameter than the pipe 13 and which is connected with a water supply pipe as hereinafter described. A rod 19 is pivoted on a pin 20 secured in the end of the T 14 and in the pipe 13 and is held centrally in the pipe 13 by means of a sleeve 21 on the pin 20 at each side of the rod 19, the end of the rod in the T being pivoted to the upper end of a vertically disposed valve stem 22 in the pipe 18, and the other end of the rod in the generator 2 being secured to the end of a metallic float 23 by means of rivets 23' through a flange 24.

The float 23 is of rectangular cross section, is tapered to a point at the rear end, and when in normal position in the generator 2 is adapted to be about centrally disposed therein. The lower end of the pipe 18 is secured in the upper end of an ordinary pipe union 25 and a similar pipe 26 is secured in the lower end of the union, there being a short section of tube 27 having a small passage 27' secured in the upper end of the pipe 26, through which the water in its passage to the generator is restricted to a small jet. The vertically disposed valve stem 22 which is movable in the pipe 18, is provided on its lower end with a rubber valve tip 28 secured in a suitable manner to the stem and is adapted to rest on the top of the pipe 26 and close the passage 27' in the tube 27, the stem being centered in the pipe by means of a collar 18' having the perforations 22' to permit the passage of the water therethrough. The ratio of movement of the inner and outer ends of the rod 19 is such that the slightest movement of the float in the generator caused by the rise or fall of the water, will affect the valve tip 28 and either open or close the passage 27' in the pipe 26, so that a greater or less amount of water may flow into the generator through the vertical pipe 18, the T 14 and the pipe 13, or the flow of the water thereto may be entirely stopped, and thus preserve a proper and uniform level of the water in the generator at all times.

The forward head 8 of the generator is provided with a steam outlet pipe 29 which is suitably positioned above or slightly to one side of the neck 11, as may be found convenient, a suitable T or cross fitting 30 is secured in the pipe at a convenient point with the other openings in the T suitably plugged, as in the T 14, so that the pipe may be easily cleaned, and the upper end of this pipe terminates in the central body 31 of the nozzle 32. The pipe 29 has a reducing plug 29' in one of its sections with a small passage 30' to permit the passage of the steam to the nozzle and limit the quantity supplied.

The nozzle 32 has a threaded projection 33 on one end adapted to be connected with a fuel supply pipe 34, and a similar but longer projection 35 on the other end which is threaded on the extreme end and adapted to receive a lock nut 36 and a cap 37. The enlarged central portion 31 of the nozzle has a vertical internally threaded chamber 38 at the end of the steam pipe 29. The projection 33 has a horizontal bore 33' into which is snugly fitted the fuel tube 39 having the small passage 40 which extends through the inlet chamber 38 and through a large bore 41 in the projection 35 on the other end of the nozzle. The tube 39 is centered in the bore 41 by means of a collar 42 having a plurality of perforations 43 for permitting the passage of the steam from the chamber 38 and the bore 41 to the cap 37, the end 44 of the tube being beveled to a point in the cap, as shown, and screwed or otherwise secured thereon. The cap 37 has a beveled opening 45 in the end which registers with the fuel passage 40 and the wall of the cap is internally threaded and adapted to screw on the end of the projection 35 a suitable distance, where it may be locked against the nut 36 and held permanently in place. The adjustment of the cap 37 on the end 35 of the nozzle regulates the spray, such adjustment being necessary, ordinarily, only when a change from one to another kind of fuel is made, as the character of the fuel may require.

It is frequently desirable, in order to obtain the best results, to deflect the flame from the burner in different directions, as when frying or boiling it is best to direct the flame against the top of the stove, but when baking it may be to advantage to direct the flame against the side of the fire box. In order to adapt our burner to such adjustments we provide a plurality of deflector disks 4 and 5, all of which are adapted to be mounted in a line on the top of the frame 3 resting on the top of the generator 2. These disks are as shown, of two types, the one 4 at the nozzle end of the generator being provided with a plurality of concentrically arranged radiating lugs 45' on one side and dissimilar from the other disks 5 only in this respect, all of said disks being provided with a central perforation 46 and a plurality of smaller perforations 47 arranged concentrically thereon. Each of the disks 4 and 5 has a foot 48 which is pivotally mounted on and secured to a boss 49 on the upper horizontal rib 50 of the frame 3 by means of the screw 51 so that by loosening the screws 51 the disks may be moved horizontally and set at any desired angle by again tightening the screws. The central perforations 46 in all of the disks are adapted to aline with the opening 45 in the nozzle cap 37, and the disks 4 and 5 serve to spread the flame from the burner, a part of the flame passing through the perforations and the remainder being thrown out horizontally to the sides at any desired angle, so that it is possible by the adjustment of the position of the disks to obtain the best results from the flame, the lugs 45' on the disks 4 affording additional radiating surface.

The frame 3 on which the disks are mounted has the end ribs 52 which are formed to fit the periphery of the generator and to rest thereon, and they may be substantially shortened so that the entire frame and the disks thereon may be tilted to one side if necessary, and the end ribs of the frame secured to the generator by means of set screws, or the frame may loosely rest on the generator as shown.

When it is desired to start a fire in the stove, a small jet of oil is turned into the burner and allowed to spray or run on a rope of asbestos which may be wrapped one or more turns around the generator 2, and which we prefer to other non-combustible materials, the rope will become saturated and the surplus oil will run into the pan 1, when a lighted match or torch may be applied and the heat from the flame thus produced will in a short time generate enough steam from the water in the generator to spray the oil from the nozzle and produce an intense heat.

A small steam pressure only is required for spraying the oil, generally about one and one half pounds pressure being sufficient to obtain good results, and as before stated it is impossible for an appreciable fluctuation of the pressure to occur, because of the automatic float controlled water supply valve, which regulates the supply of water to the generator.

As may be observed from the foregoing description, the operation of only the fuel supply valve is necessary in the operation and use of our burner, as the water is automatically controlled. A globe or other type of valve may be placed in the water supply pipe for emergency use, though we do not deem it necessary, and a safety pop valve may be placed at the top of the steam generator to insure against an over supply of steam in the event of the disarrangement of the float valve mechanism, neither of said valves being ordinarily necessary, and forming no part of our present invention.

We are aware that patents have been granted upon devices for the same purpose of our invention and that the use of steam for spraying the fuel and floats for regulating the water supply are not new, but we are not aware that all of the improvements shown herein have ever been used, the structure of our burner as shown and described, being of prime importance and the relation of the various elements forming an entirely new and useful combination, the form and application of which, may be obviously changed in many particulars without departing from the spirit of our invention or limiting the scope thereof.

Having thus described our invention, what we claim is:

1. A liquid fuel burner capable of being applied to cooking stoves and the like comprising a base having a fuel chamber, a steam generator removably mounted thereon, water supply means for the generator, horizontally disposed float means disposed within the generator and pivoted in the water supply means for regulating the quantity of water delivered to the generator, a nozzle disposed above the generator and connected therewith, and means above the generator in the plane of the nozzle for deflecting the flame horizontally over the generator and affording additional radiating surface therefor.

2. A liquid fuel burner capable of being applied to cooking stoves and the like comprising a base having a fuel chamber, a steam generator removably positioned thereon and above said chamber, a skeleton frame removably positioned on the generator and said base, a nozzle disposed over the generator and connected therewith, fuel supply means for the nozzle and water supply means for the generator, float means disposed within the generator and pivoted in the water supply means for regulating the quantity of water delivered therethrough, and means for limiting the quantity of steam delivered to the nozzle, in combination.

3. A liquid fuel burner capable of being applied to cooking stoves and the like provided with a fuel receptacle for holding a quantity of fuel for preliminary heating of the generator, a generator removably positioned on the fuel receptacle for supplying steam to the nozzle, means for supplying water to the generator, float means in the generator for regulating the quantity of water supplied thereto, a nozzle connected with the generator for spraying the flame therearound, means for supplying fuel to the nozzle, and adjustable means disposed in the plane of the nozzle for deflecting the flame horizontally over the generator, in combination.

4. A liquid fuel burner capable of being applied to cooking stoves and the like provided with a fuel receptacle for holding a quantity of fuel for the preliminary heating of the generator, a generator removably positioned thereon for supplying steam to the nozzle, a skeleton frame removably positioned on the generator, a nozzle disposed over the generator for spraying the flame therearound, fuel supply means for the nozzle, means for connecting the nozzle with the generator for delivering a limited quantity of steam thereto, a plurality of disks in the plane of the nozzle and adjustably mounted on said frame for horizontally deflecting the frame at a desired angle from the nozzle and for affording a maximum radiating surface, and float controlled means connected with the generator for supplying water to the generator, in combination.

PHINEAS A. VORE.
VERNON W. VORE.

Witnesses:
ANNE HARTENSTEIN,
LUTHER L. MACK.

Copies of this patent may be obtained for five cents each, by addressing the "Commissioner of Patents, Washington, D. C."